(12) United States Patent
Ishii

(10) Patent No.: US 7,370,804 B2
(45) Date of Patent: May 13, 2008

(54) IC CARD READER

(75) Inventor: Masayuki Ishii, Yasu (JP)

(73) Assignee: Hitachi-Omron Terminal Solutions Corp., Tokyo (JP)

( * ) Notice: Subject to any disclaimer, the term of this patent is extended or adjusted under 35 U.S.C. 154(b) by 395 days.

(21) Appl. No.: 11/080,510

(22) Filed: Mar. 16, 2005

(65) Prior Publication Data

US 2005/0211779 A1   Sep. 29, 2005

(30) Foreign Application Priority Data

Mar. 17, 2004   (JP) ............................. 2004-075552

(51) Int. Cl.
*G06K 13/00*   (2006.01)

(52) U.S. Cl. ...................... 235/475; 235/483; 235/484; 235/485

(58) Field of Classification Search ................ 235/475, 235/483, 484, 485, 486
See application file for complete search history.

(56) References Cited

U.S. PATENT DOCUMENTS 4,904,852 A *   2/1990   Mita et al. ................... 235/479

FOREIGN PATENT DOCUMENTS

| CN | 2423619 | 3/2007 |
|---|---|---|
| JP | 62-271287 | 11/1987 |
| JP | 2593143 | 12/1996 |
| JP | 09-147064 | 6/1997 |
| JP | 10-063792 | 3/1998 |

* cited by examiner

*Primary Examiner*—Karl D. Frech
(74) *Attorney, Agent, or Firm*—Mattingly, Stanger, Malur & Brundidge, PC

(57) ABSTRACT

An IC card reader includes contactors contacting to IC contact points of the IC card, a frame forming with a card insertion path into which the IC card is inserted and a retraction domain for retracting the contactors in a direction away from the insertion path, a plate spring biasing the contactors to the retraction domain, and a mechanism responsive to the insertion of the IC card, advancing the contactors into the insertion path with the plate spring deflected to make contact the contactors to the IC contact points of the IC card, and responsive to extraction of the IC card and retracting the contactors to the retraction domain with the plate spring released force of the plate spring, becoming difficult for deformation and damage of the contactors.

4 Claims, 14 Drawing Sheets

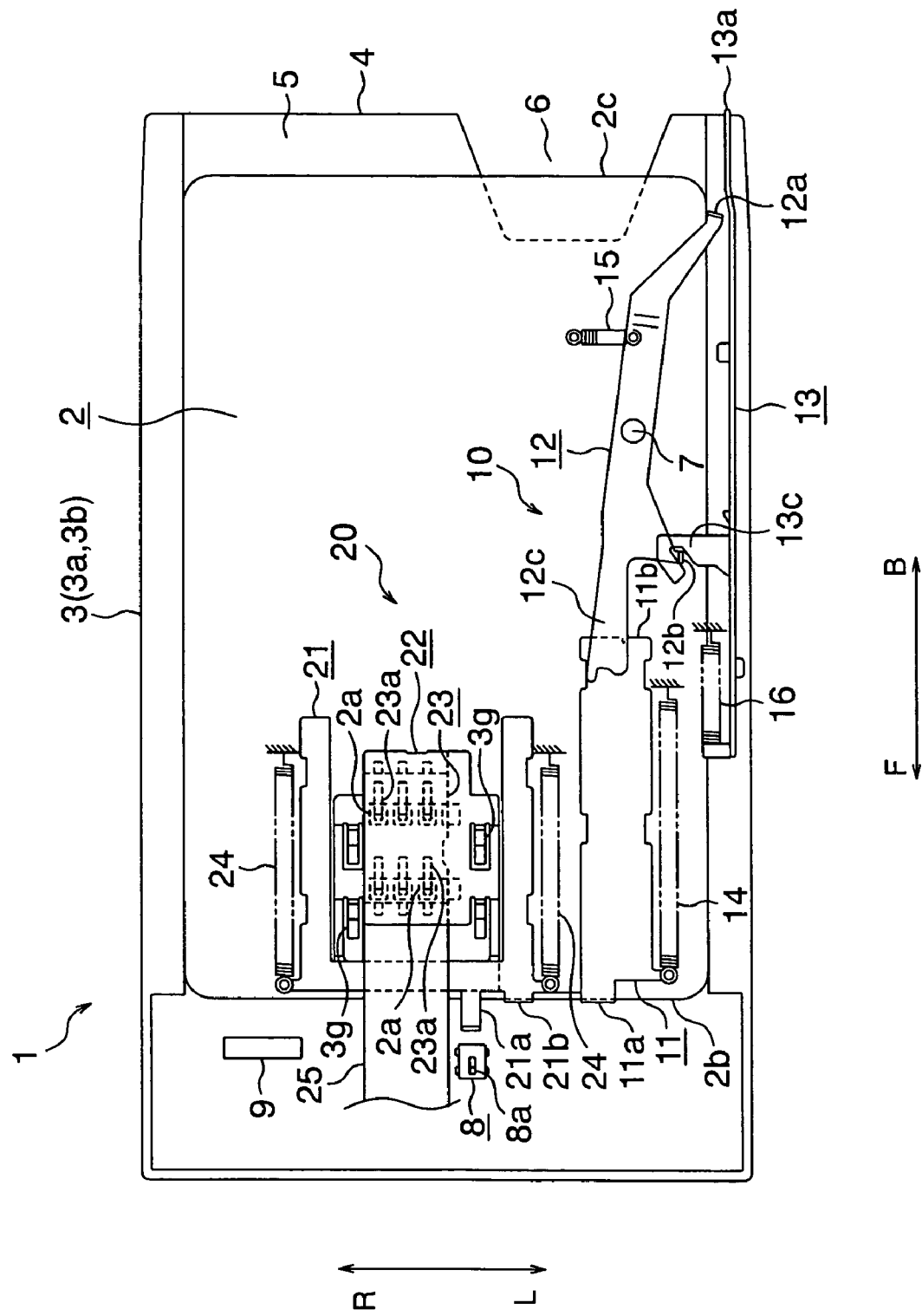

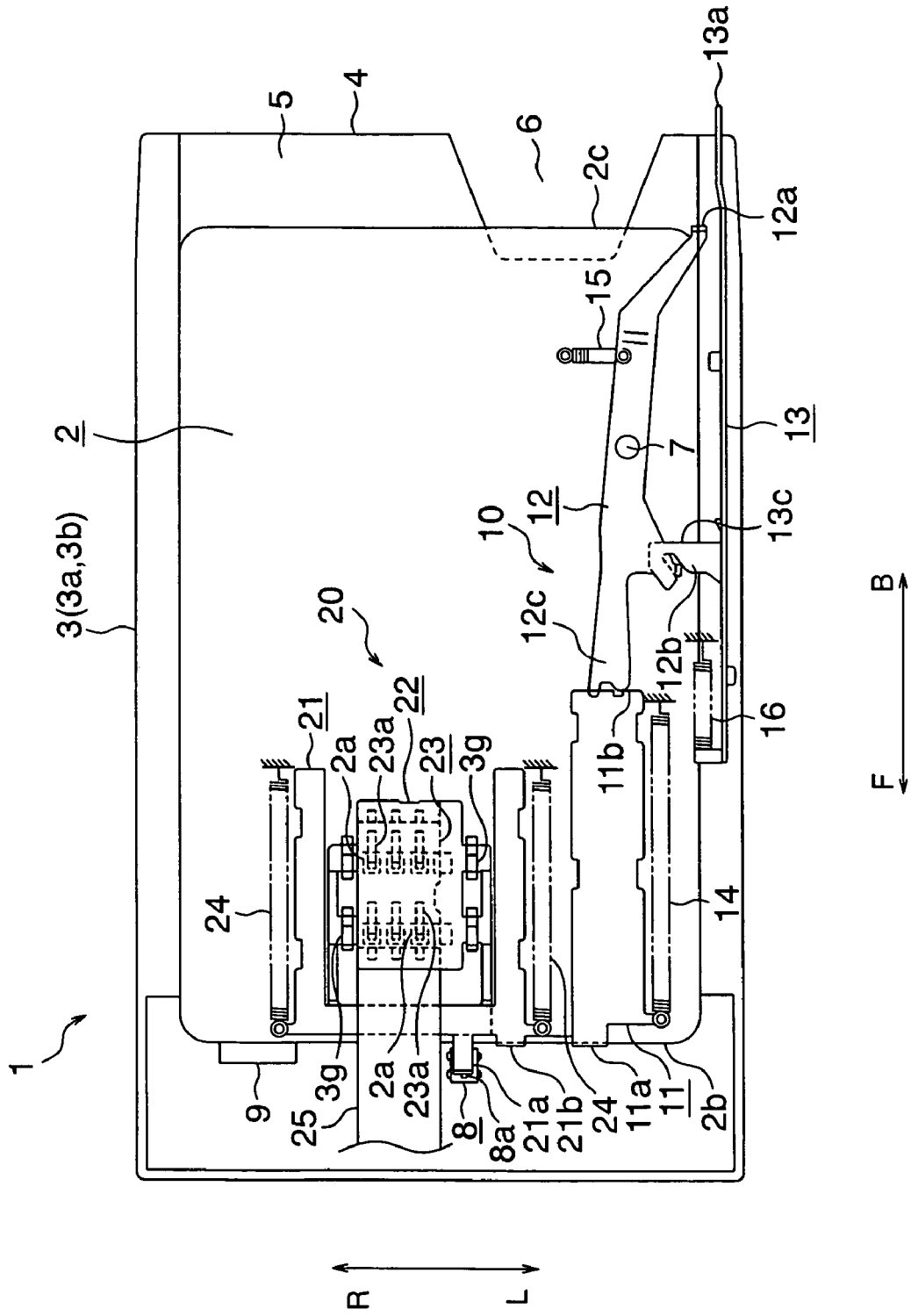

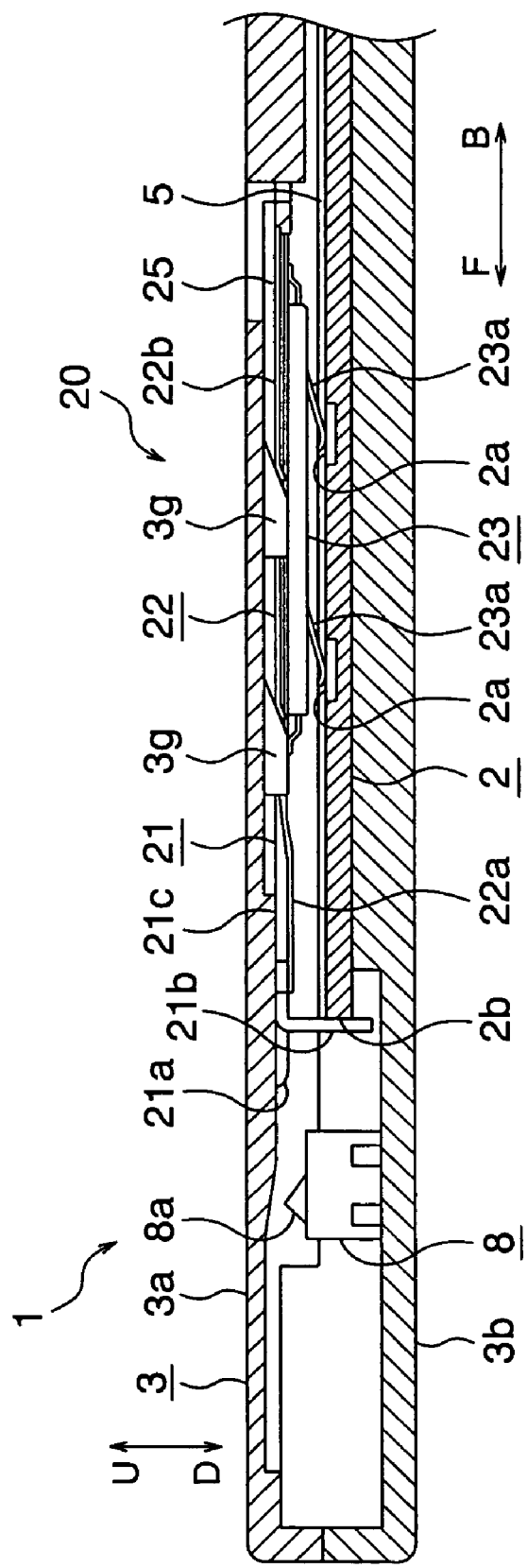

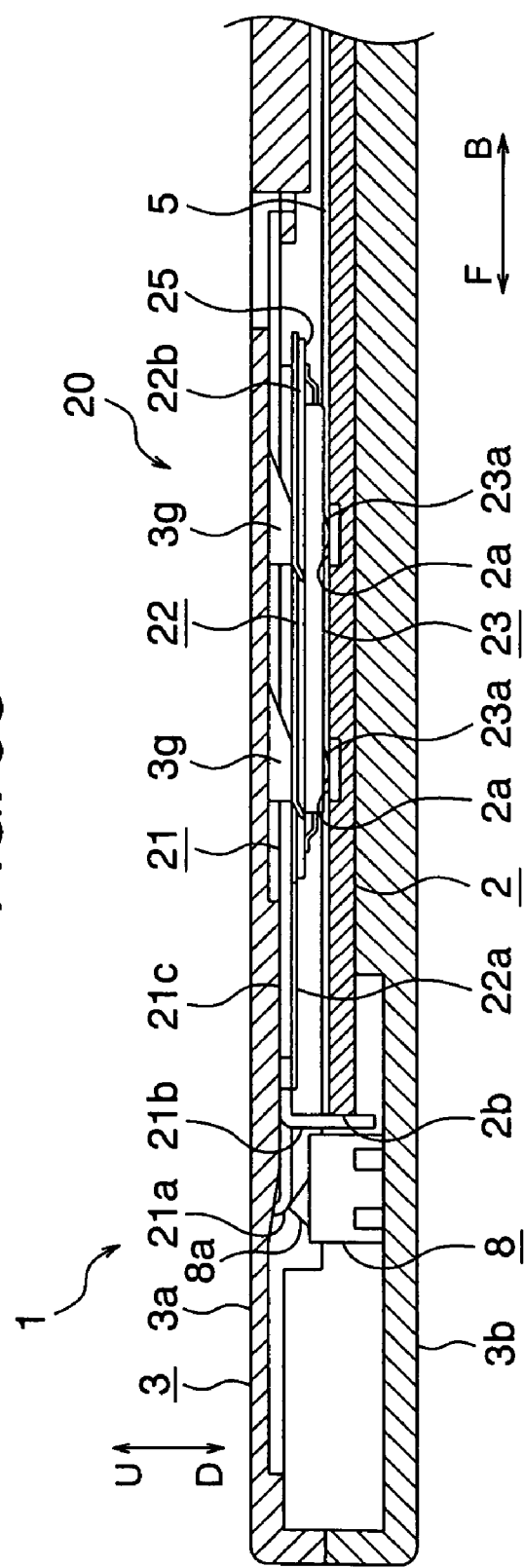

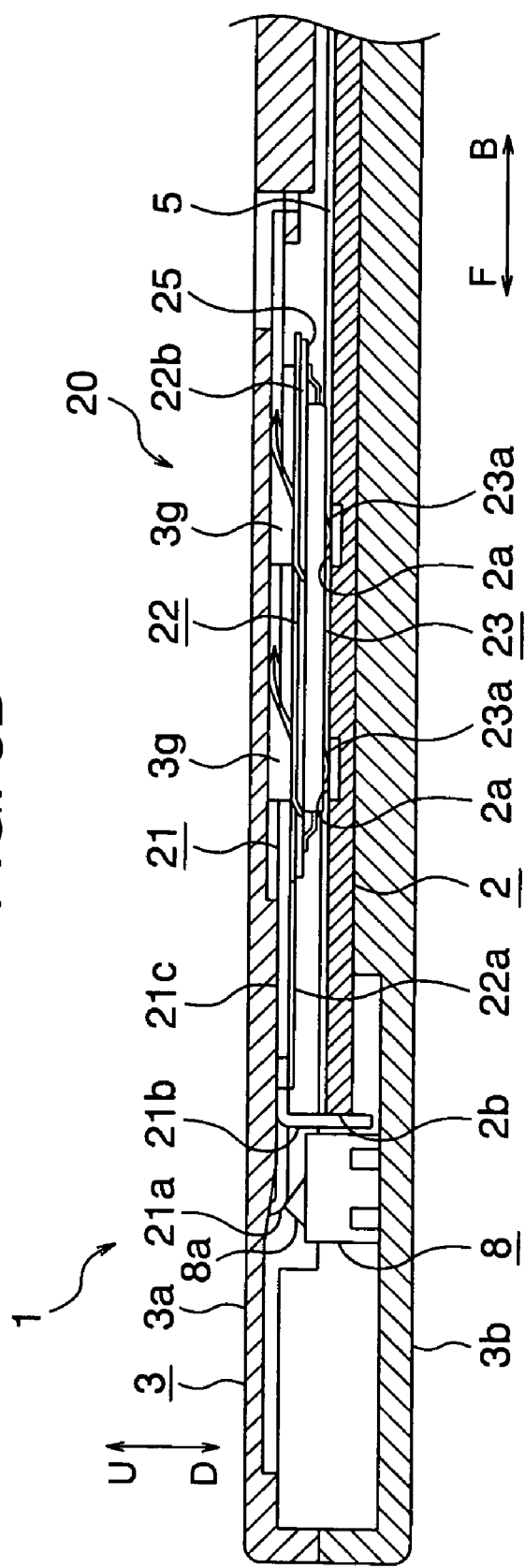

IC CARD READER

INCORPORATION BY REFERENCE

The present application claims priority from Japanese application JP2004-075552 filed on Mar. 17, 2004, the content of which is hereby incorporated by reference into this application.

BACKGROUND OF THE INVENTION

The present invention pertains to an IC (Integrated Circuit) card reader which performs processing of information by bringing contactors into contact with IC contact points of the IC card.

There are IC card readers which perform information processing with respect to contact-type IC cards. These IC card readers ensure a state of electrical connection with the IC card by bringing electrically conductive contactors into contact with IC contact points provided on the front face of the IC card, and, through the contact or and the IC contact, perform read or write processing of information with respect to the IC card.

In order to bring contactors into contact with the IC contact points of an IC card, various structures have been proposed for some time. E.g., in JP-A-10-63792, a contactor is ordinarily made to protrude into the card insertion path into which an IC card is inserted. When, as a result of this, the IC card is inserted into the card insertion path and the advanced end of the IC card makes contact against the contactor, the contactor hits the top side of the IC card, and when the IC card has been inserted up to a specified position, the contactor is located on the IC contact point of the IC card and is in contact with the IC contact point.

Also, in JP-A-9-147064, a contact head is disposed in the upper part of the card insertion path by using a linking mechanism, a contactor is provided on the contact head so as to face the card insertion path, and a contact portion is provided so as to protrude to the card insertion path. In this way, the IC card is inserted into the card insertion path by a transport means, and when the advanced end of the IC card makes contact with the contact portion, the contact head is pushed toward the IC card and is moved obliquely downward as a result of a rotation of the linking mechanism, and the contactor is brought into contact with the IC contact point of the IC card.

Moreover, in Japanese Patent No. 2593143, there are disposed, in the upper part of the card insertion path, a component made up of a card groove formed on the lateral face and inclined in a downward direction and a carriage supported by means of a support pin in the guiding groove, there being provided on the concerned carriage a contactor facing the card insertion path and a contact portion protruding in the card transport path. In this way, when the IC card is inserted into the card insertion path and the advanced end of the IC card makes contact with the contact portion, the carriage is pushed by the IC card and moves obliquely downward due to a movement along the guiding groove of the support pin, and brings the contactor into contact with the IC contact point of the IC card.

In the structure of the aforementioned JP-A-10-63792, since the contactor is ordinarily made to protrude into the card insertion path, the leading edge of the IC card makes contact with the contactor when the IC card is inserted, so it is easy for deformation or damage of the contactor to occur. If deformation or damage of the contactor occurs, the contactor no longer makes contact with the IC contact point of the IC card, and the IC card reader can not perform information processing with respect to the IC card and becomes impossible to use. In other words, with the structure of JP-A-10-63792, there is a problem of the IC card reader being short-lived.

Since, in the structure of the aforementioned JP-A-9-147064 and Japanese Patent No. 2593143, the connector head or the carriage is located in the upper part of the card insertion path and the contactor is retracted from the card insertion path when the IC card has not yet been inserted, and the connector or the carriage moves obliquely downward to approach the IC card and the contactor is brought into contact with the IC contact point of the IC card when the IC card is inserted, it is difficult for deformation or damage of the contactor to occur, so the life of the IC card reader can be extended.

However, with the structure of JP-A-9-147064, a relatively large space must be reserved in the upper part of the card insertion path for the purpose of rotating the linking mechanism in order to move the contactor from a position where it is retracted from the card insertion path to a position where it is in contact with the IC contact point of the IC card, since a contact head and a linking mechanism are used, so the IC card reader ends up being thick. Also, with the structure of Japanese Patent No. 2593143, since a guide component made up of a carriage, a support pin, and a guiding groove is used, it is necessary to let the guide component height have a size enabling the formation of a guiding groove having a width exceeding the diameter of the support pin i.e. a size resulting from adding, to the height from the bottom to the top of the guiding groove, the distance from the top of the guide component to the top of the guiding groove and the distance from the bottom of the guide component to the bottom of the guiding groove. As a result, a relatively large space must be reserved in the upper part of the card insertion path for the purpose of disposing the guide component, so the IC card reader ends up being thick. In other words, with the structure of JP-A-9-147064 and Japanese Patent No. 2593143, there is the problem of not being able to provide for making IC card readers thinner.

SUMMARY OF THE INVENTION

The present invention solves the aforementioned problems, the areas considered as issues requiring resolution consisting in providing for extending the life of IC card readers and making them thinner.

In order to solve the aforementioned problems, in the present invention, a retraction domain for retracting the contactors which make contact with the IC contact points of the IC card is formed in the insertion path, of the IC card reader frame, into which the IC card is inserted, the contactors are biased to the retraction domain by means of a plate spring, and a mechanism is provided which moves in response to the insertion of the IC card, deflects the plate spring to make the contactors advance into the insertion path and brings them into contact with the IC contact points of the IC card, and which moves in response to the extraction of the IC card, and releases the force on the plate spring to retract the contactors to the retraction domain.

Since, according to the present invention, the plate spring retracts the contactors from the card insertion path when the IC card is not yet inserted, and the plate spring brings the contactors into contact with the IC contact points of the IC card when the IC card is inserted, it becomes difficult for deformation and damage of the contactors to occur, so it becomes possible to provide for an extension of the lifetime of IC card readers. Moreover, since the contactors are moved, due to the deflection of the plate spring, from a position where they are retracted from the card insertion path to a position where they can make contact with the IC contact points of the IC card, it becomes sufficient to ensure only a small space enabling the retraction of the contactors to an area in the proximity of the card insertion path, so it becomes possible to provide for making IC card readers thinner.

More specifically, the IC card reader is provided with a frame in which a card insertion path is formed into which the IC card is inserted, contactors which make contact with the IC contact points of the IC card, a slider provided so as to be able to move in parallel with and facing the card insertion path, a tab provided on the slider so as to make contact with the advanced end of the IC card inserted into the card insertion path, a spring which biases the slider in a direction counter to the insertion direction of the IC card, a plate spring, fastened at one end portion to the slider and with the contactors mounted to the other end portion so as to face the card insertion path, which biases the contactors in a direction away from the card insertion path and retracts them from the card insertion path, and protrusions provided on the frame so as to face the card insertion path. In this configuration, when the advanced end of the IC card makes contact with the tab, as a result of the IC card being inserted into the card insertion path, and the slider moves in the direction of insertion of the IC card, the plate spring makes contact with the protrusions and gets deflected in a direction toward the card insertion path, makes the contactors advance to the card insertion path and brings them into contact with the IC contact points of the IC card.

By proceeding as described above, the plate spring retracts the contactors in a direction away from the card insertion path by biasing them when the IC card is not yet inserted into the card insertion path, and the plate spring gets deflected in a direction toward the card insertion path and brings the contactors into contact with the IC contact point of the IC card, when the IC card is inserted into the card insertion path. In this way, it becomes more difficult for deformation or damage of the contactor to occur, and it becomes possible to provide for an extension of the lifetime of the IC card reader. Also, by mounting the contactors to the plate spring moving together with the slider and deflecting the plate spring by contact with the protrusions, the contactors move from a position where they are retracted from the card insertion path to a position where they can make contact with the IC contact points of the IC card. As a result of this, it becomes sufficient to ensure only a relatively small space enabling the retraction of the contactors from the card insertion path to an area in the proximity of the card insertion path, so it becomes possible to provide for making IC card readers thinner.

In addition, with the IC card reader related to an embodiment of the present invention, at least two protrusions are provided in the direction of insertion of the IC card, and the plate spring gets deflected in a direction toward the card insertion path by making contact with each protrusion. In this manner, the plate spring gets deflected approximately in parallel with respect to the card insertion path, and it becomes possible to bring the contactors into contact with the IC contact points of the IC card reader in a stable manner, without hitting the protrusions, so it becomes possible to make it even more difficult for deformation and damage of the contactor to occur.

Also, with the IC card reader related to an embodiment of the present invention, the parts of the protrusions and the plate spring which are in mutual contact are inclined with respect to the direction of insertion of the IC card, toward a direction approaching the card insertion path. In this manner, the plate spring gets deflected smoothly along the protrusions in a direction toward the card insertion path without hitting the protrusions, and it is possible to bring the contactors gradually into contact with the IC contact points of the IC card, thus making it possible to make it even more difficult for deformation and damage of the contactor to occur.

Other objects, features and advantages of the invention will become apparent from the following description of the embodiments of the invention taken in conjunction with the accompanying drawings.

BRIEF DESCRIPTION OF THE DRAWINGS

FIG. 7A is a general plan view explaining the operation of the IC card reader.

FIG. 7D is a general plan view explaining the operation of the IC card reader.

FIG. 8B is an enlarged lateral cross-sectional view of the principal portion, explaining the operation of the IC card reader.

FIG. 8C is an enlarged lateral cross-sectional view of the principal portion, explaining the operation of the IC card reader.

FIG. 8D is an enlarged lateral cross-sectional view of the principal portion, explaining the operation of the IC card reader.

DETAILED DESCRIPTION OF THE EMBODIMENTS

Figure 1:
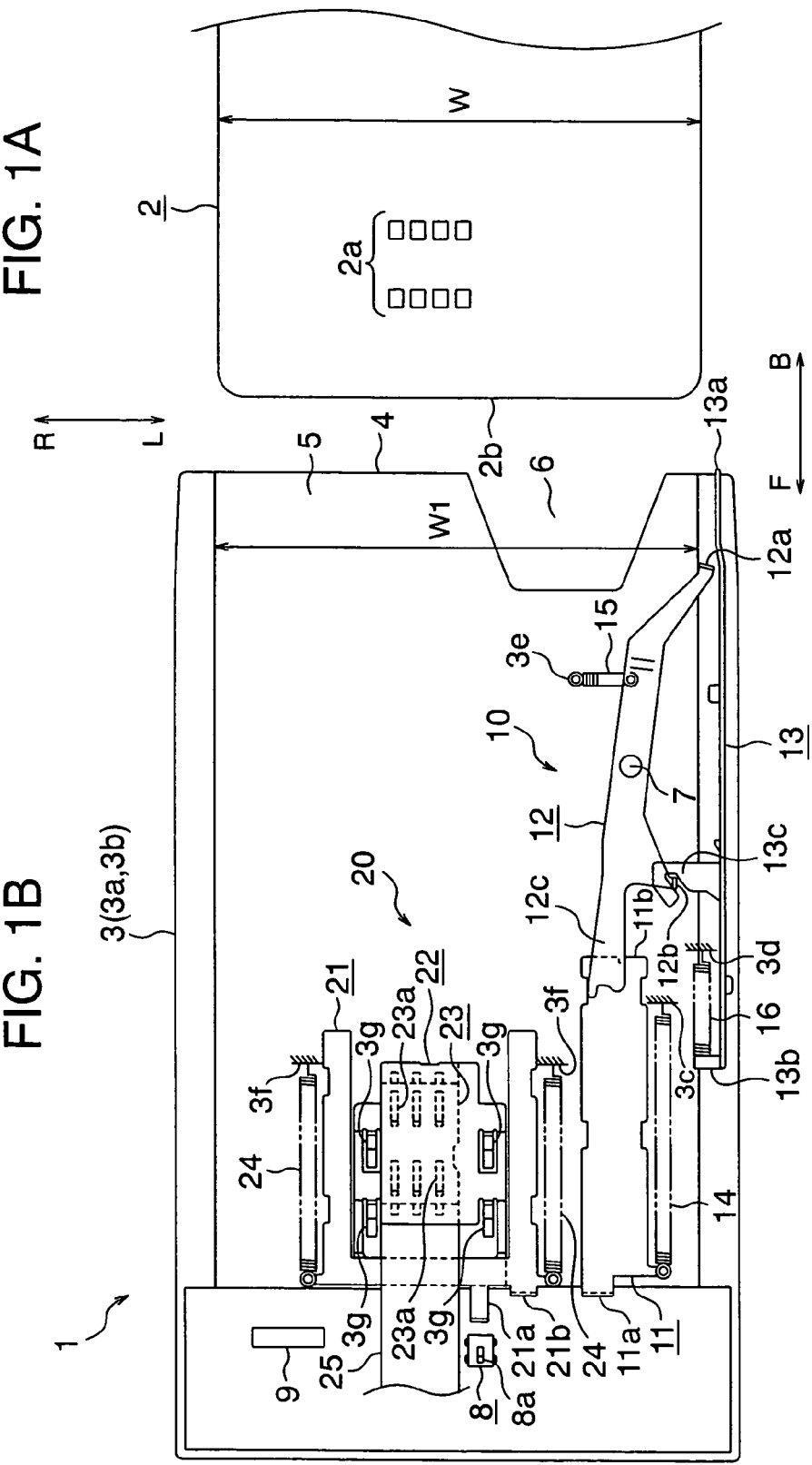
FIGS. 1A and 1B are plan views showing an IC card and the internal structure of an IC card reader.
Figure 2:
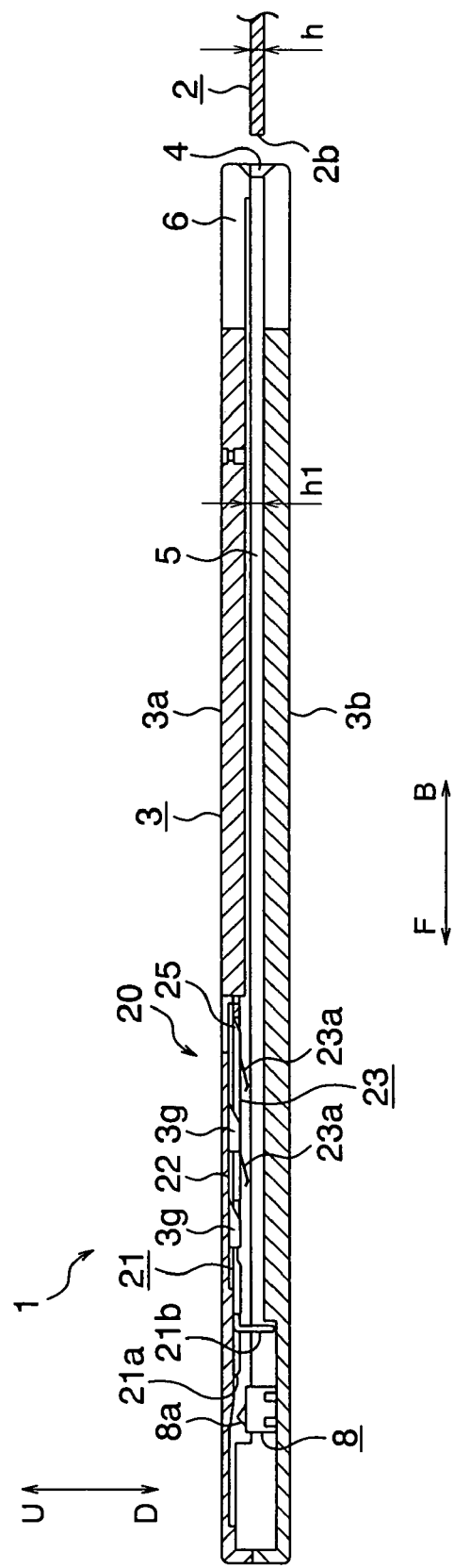
FIG. 2 is a lateral cross-sectional view showing the internal structure of the IC card reader.

FIGS. 1A and 1B and FIG. 2 are diagrams showing the internal structure of an IC card reader related to an embodiment of the present invention. FIGS. 1A and 1B are the plan views of the same, and FIG. 2 is the lateral cross-sectional view of the same. In FIGS. 1A and 1B, reference numeral 1 designates the card reader. This card reader 1 performs read and write processing of information with respect to a contact-type IC card 2. IC card 2 is provided with IC contact points 2a on the front face and in its interior, it is provided with an IC chip (not shown) wherein prescribed data are stored. Reference 3 designates a frame of IC card reader 1. This frame 3 is assembled, as shown in FIG. 2, by superposing and combining an upper frame 3a and a lower frame 3b. In frame 3, there are formed an insertion slot 4 into which IC card 2 is inserted and a card insertion path 5. In the proximity of insertion slot 4, a notch 6 is provided. By inserting a finger in this notch 6, it is possible to insert IC card 2 deep into and to extract it from deep within card insertion path 5. The width W1 of card insertion path 5 (shown in FIGS. 1A and 1B) is approximately the same as the width W of IC card 2 in the direction of its shorter side. As a result, it is possible to insert IC card 2 into card insertion path 5 without any ricketiness in the width directions R, L. Also, the height h1 (shown in FIG. 2) of card insertion path 5 is greater than the thickness h of IC card 2 by a prescribed amount. In this example, the height h1 of card insertion path 5 is approximately 1.4 mm, as against the thickness h of IC card 2 being 0.76 mm. In this way, it is possible to insert IC card 2 into card insertion path 5, even if IC card 2 is warped to a certain extent.

Reference 10 shown in FIGS. 1A and 1B is a card locking mechanism provided inside frame 3 and situated higher than card insertion path 5. This card locking mechanism 10 is composed of a plate 11, a lever 12, an ejector pin 13 as well as coil springs 14 to 16. Plate 11 is provided so as to be able to move in parallel with card insertion path 5, in the F, B directions. On the F direction side of this plate 11, there is formed a tab 11a protruding in a downward direction which makes contact with an advanced end 2b of IC card 2 which is inserted into card insertion path 5. Also, on the B direction side of plate 11, there is formed a tab 11b protruding in an upward direction which makes contact with an end portion 12c on the F direction side of lever 12. Coil spring 14 is suspended from plate 11 on one side and is suspended on the other side from a wall 3c of upper frame 3a. This coil spring 14 biases plate 11 in the B direction counter to the direction of insertion of IC card 2.

Lever 12 is provided in upper frame 3a so as to be able to rotate around an axis 7. On the L direction side of this lever 12, a tab 12b suspended from a hook portion 13c of ejector pin 13 is formed so as to protrude in a downward direction. Also, on the B direction side of lever 12, there is formed a tab 12a so as to face downward and protrude, which makes contact with the rear end of IC card 2 when the latter is completely inserted up to a prescribed position of card insertion path 5. Coil spring 15 is suspended from lever 12 on one side and is suspended on the other side from a boss 3e formed in upper frame 3a. This coil spring 15 adds the capacity of lever 12 to rotate in a counter-clockwise direction.

Ejector pin 13 is formed on the L direction side of card insertion path 5. In the approximately central portion of this ejector pin 13, hook portion 13c is formed from which tab 12b of lever 12 is suspended. A front end portion 13a on the B direction side of ejector pin 13 protrudes from frame 3 to the exterior. Coil spring 16 is suspended on one side from a rear end portion 13b of ejector pin 13 and is suspended on the other side from a wall 3d of upper frame 3a. This coil spring 16 biases ejector pin 13 in the B direction counter to the direction of insertion of IC card 2.

Figure 3A:
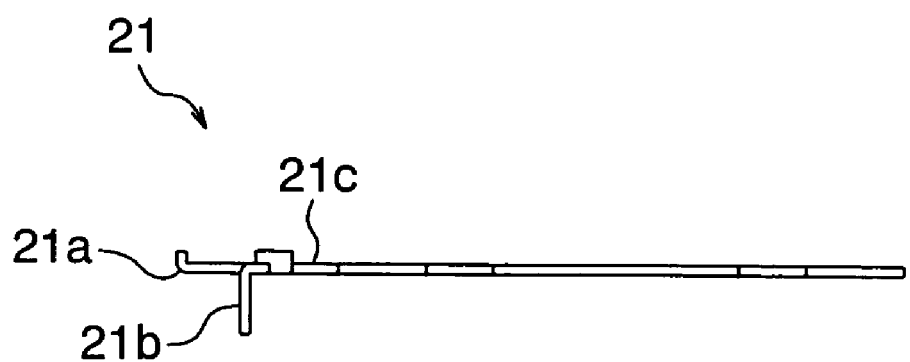
FIGS. 3A and 3B are a lateral view and a plan view showing a slider provided in the IC card reader.
Figure 3B:
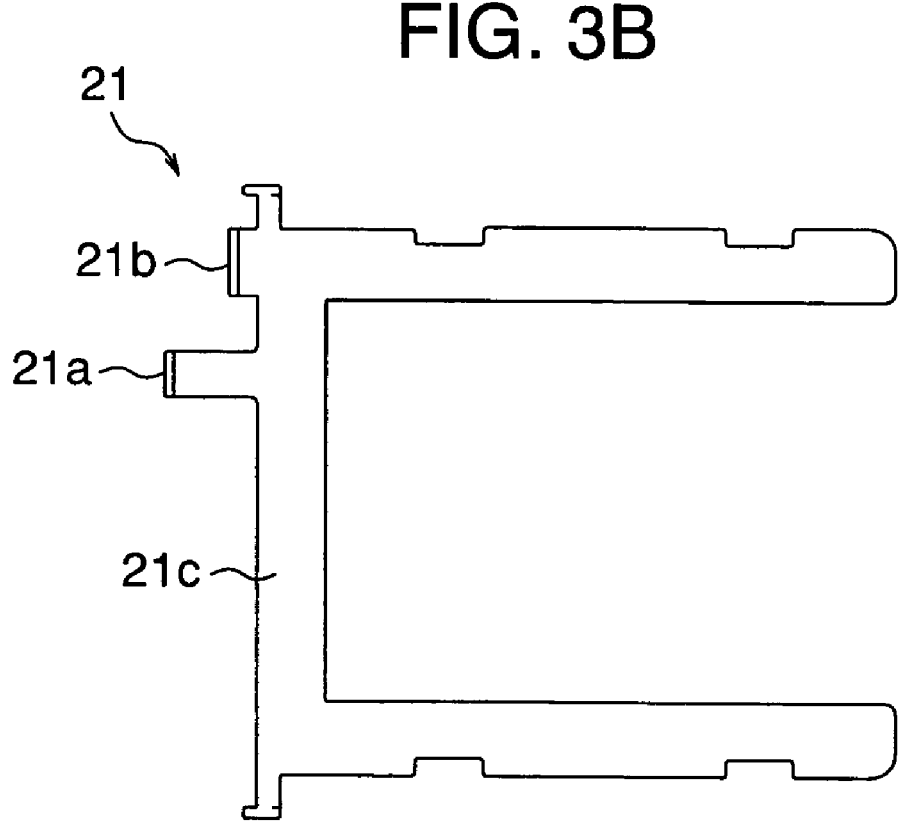
Figure 4A:
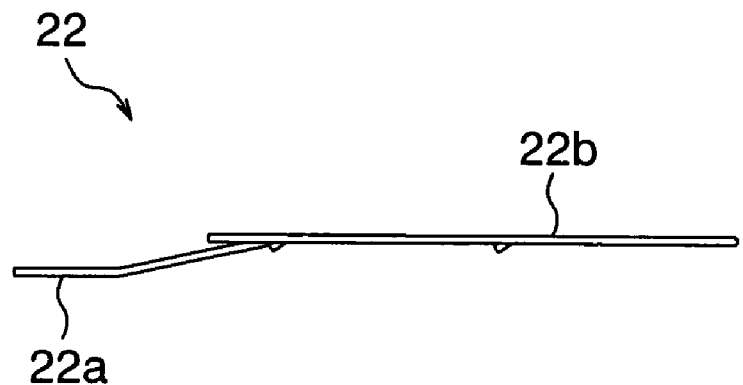
FIGS. 4A and 4B are a lateral view and a plan view showing plate spring provided in the IC card reader.
Figure 4B:
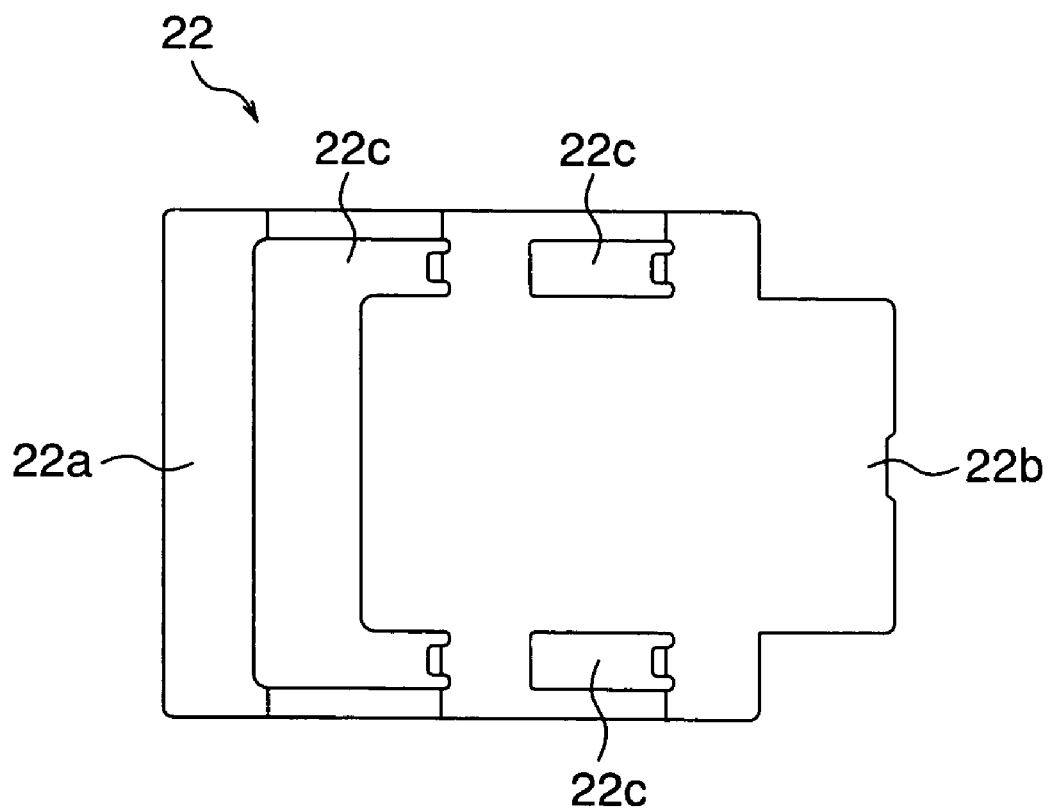
Figure 5A:
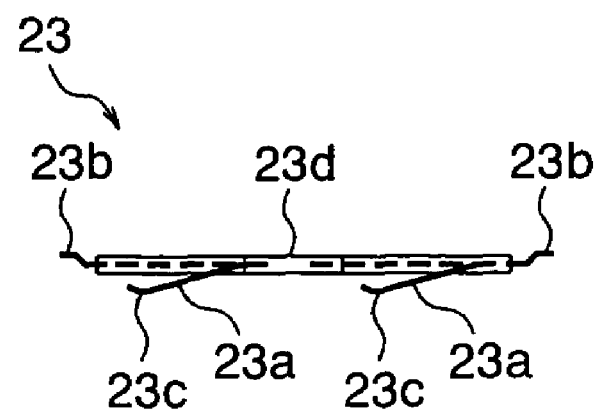
FIGS. 5A and 5B are a lateral view and a plan view showing a connector provided in the IC card reader.
Figure 5B:
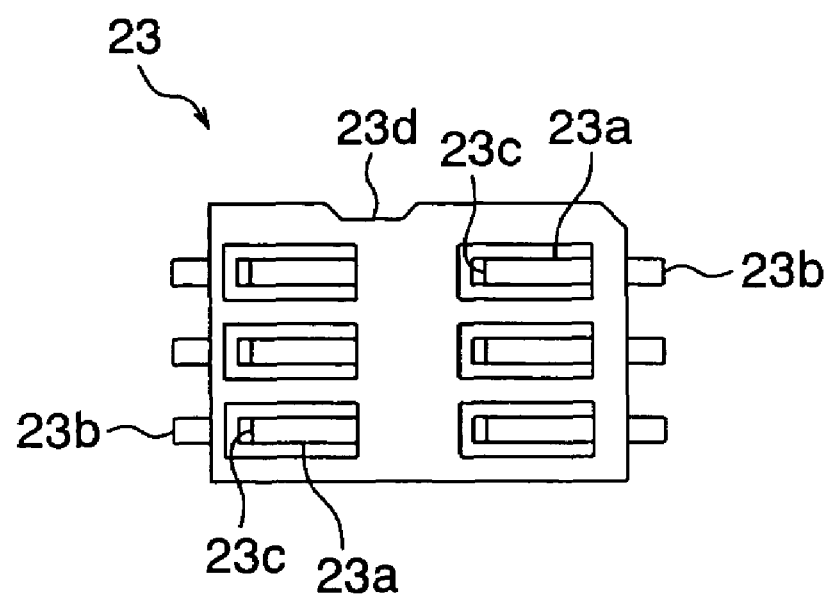
Figure 6A:
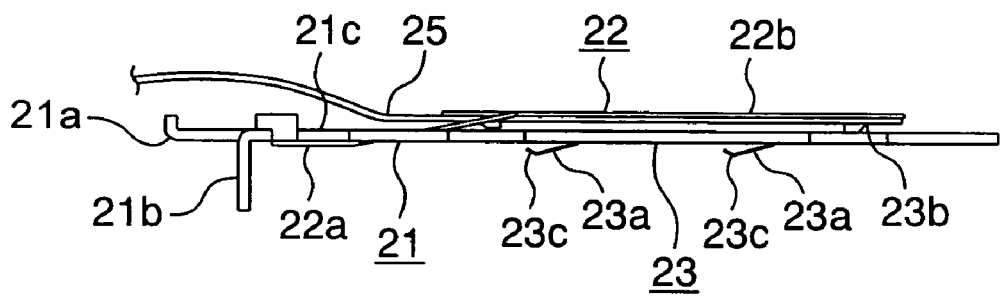
FIGS. 6A and 6B are a lateral view and a plan view showing the construction of an IC contact unit provided in the IC card reader.
Figure 6B:
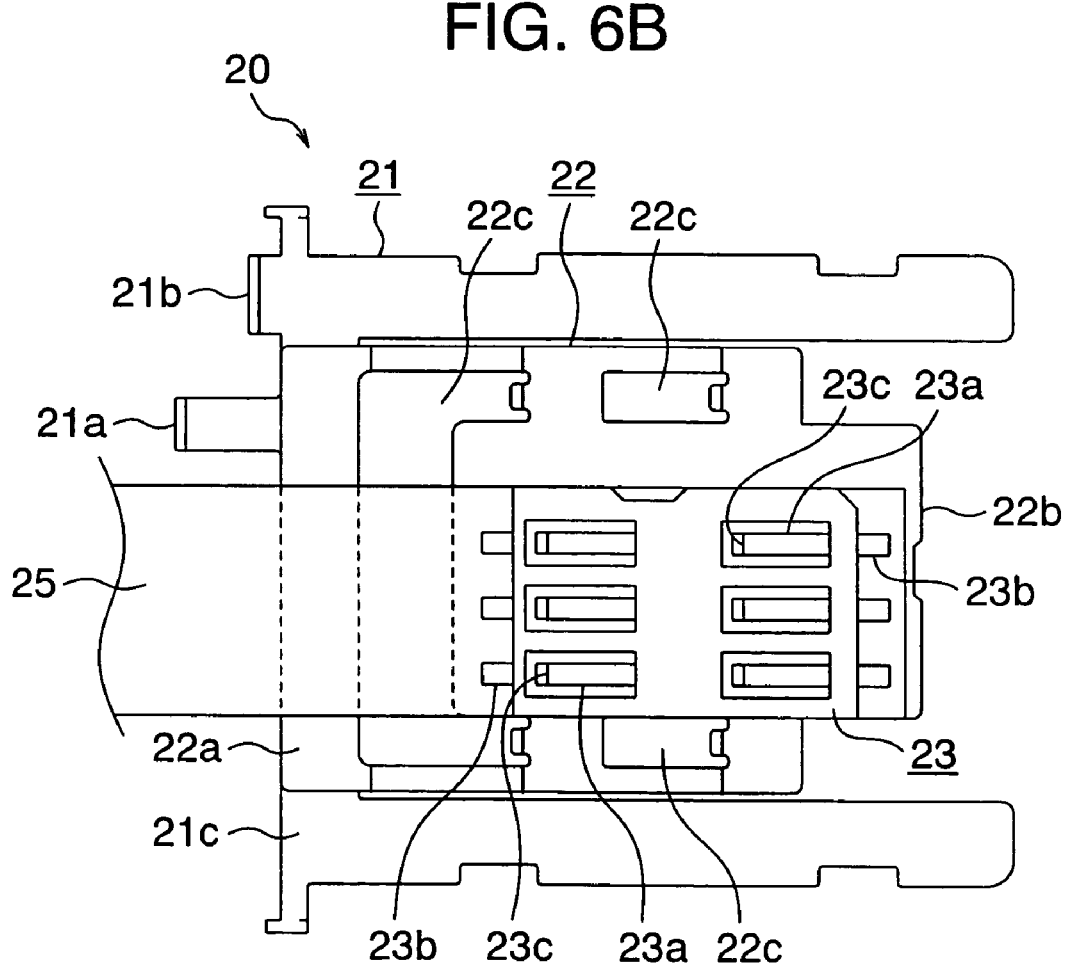

Reference 20 designates an IC contact unit provided inside frame 3 in a part situated higher than card insertion path 5. This IC contact unit 20 is composed of a slider 21, a plate spring 22, a connector 23, as well as coil springs 24. The details of each portion are included in FIGS. 1A and 1B and FIG. 2 and will be explained with reference to FIGS. 3A, 3B, 4A, 4B, 5A, 5B, 6A, and 6B. Further, FIGS. 3A and 3B are diagrams showing slider 21, FIGS. 4A and 4B are diagrams showing plate spring 22, FIGS. 5A and 5B are diagrams showing connector 23, and FIGS. 6A and 6B are diagrams showing the construction of IC contact unit 20 (coil springs 24 are not illustrated). Also, FIGS. 5A and 6A are the respective lateral views, and FIGS. 5B and 6B are the respective bottom plan views (views taken from the lower parts in FIGS. 5A and 6A).

Slider 21 is formed, as shown in FIGS. 3A and 3B, from a thin plate of approximately concave shape. As shown in FIGS. 1A, 1B, and 2, this slider 21, supported by upper frame 3a, is provided so as to be able to move, facing card insertion path 5, in the F, B directions in parallel with card insertion path 5. On the F direction side of slider 21, a contact side 21a which makes contact with an actuator 8a of a photomicrosensor 8, is formed so as to protrude in the F direction. Photomicrosensor 8 is for detecting whether IC card 2 has been completely inserted up to a prescribed position deep inside card insertion path 5. Further, IC card 2 can be inserted in the F direction into card insertion path 5, until its advanced end 2b makes contact against a stopper 9 (shown in FIG. 1B). In the proximity of contact side 21a, a tab 21b which makes contact with advanced end 2b of IC card 2 inserted into card insertion path 5 is formed so as to protrude in a downward direction. Coil springs 24 are suspended, respectively, from slider 21 on one side and from a wall 3f of upper frame 3a on the other side. This coil spring 24 biases slider 21 in a B direction counter to the direction of insertion of IC card 2.

Plate spring 22 is formed by bending a thin plate in two stages, as shown in FIGS. 4A and 4B. A first end portion 22a, made to fall in a downward direction of this plate spring 22, is fastened by means of spot welding, an adhesive or the like to the bottom face of a cross beam portion 21c of slider 21, as shown in FIGS. 6A and 6B. Also, on the bottom face of a second end portion 22b, raised in an upward direction of plate spring 22, an FPC 25 (Flexible Printed Circuit), on which connector 23 is surface mounted as shown in FIGS. 6A and 6B, is mounted by means of double-sided adhesive tape, an adhesive or the like. As shown in FIGS. 1A, 1B, and FIG. 2, protrusions 3g provided in upper frame 3a so as to face card insertion path 5 are telescoped into three holes 22c drilled through the center of plate spring 22. A total of four protrusions 3g are provided, as shown in FIGS. 1A and 1B, to sandwich connector 23, two in the direction F of insertion of IC card 2 and two in the width directions R, L. The lateral faces of protrusions 3g on the B direction side and the plate spring 22 lateral faces facing the former lateral faces are inclined toward a direction D approaching card insertion path 5 (downward direction) at a prescribed angle with respect to the direction F of insertion of IC card 2, as shown in FIG. 2.

As shown in FIGS. 5A and 5B, connector 23 is formed by means of insert molding and consists of a base 23d made of synthetic resin and a plurality of electrically conductive contactors 23a. As shown in FIG. 6A, lead portions 23b of contactors 23a are attached to FPC 25 by means of soldering, and contact point portions 23c protrude beyond slider 21 in a downward direction, as shown in FIG. 6A. Inside frame 3, contactors 23a are, biased by means of a plate spring 22, as shown in FIG. 2, in a direction U away from card insertion path 5 (upward direction) and are retracted from card insertion path 5. When IC card 2 is inserted into card insertion path 5, contactors 23a will by elastic deformation apply a prescribed pressure, as will be described subsequently, to make contact with IC contact points 2a of IC card 2. FPC 25 is connected to a board, not illustrated, provided inside frame 3. On the board, there are installed control circuits for performing, the processing of reading or writing information with respect to IC card 2, and communication with a host device such as a Personal Computer.

Figure 7B:
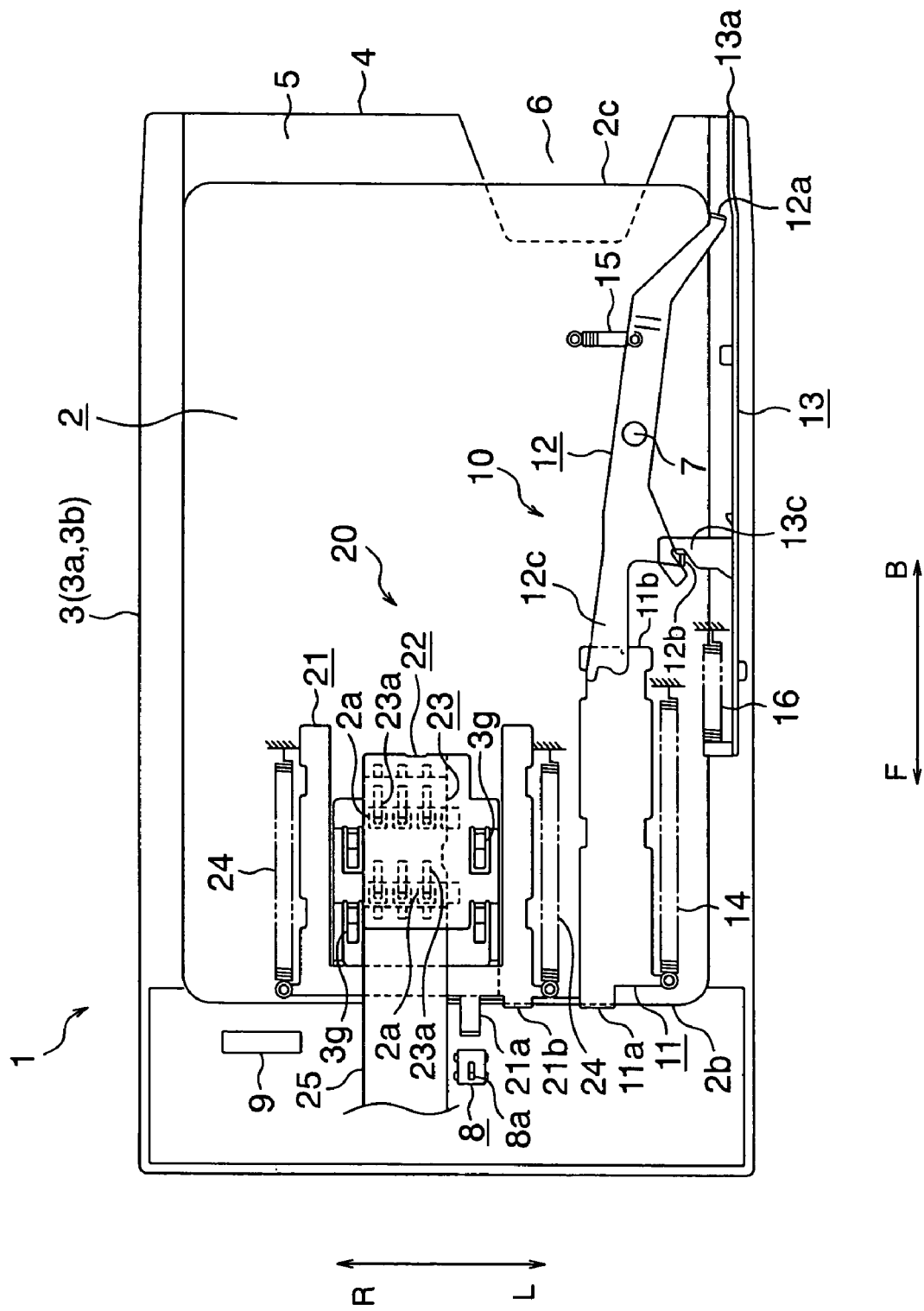
FIG. 7B is a general plan view explaining the operation of the IC card reader.
Figure 7C:
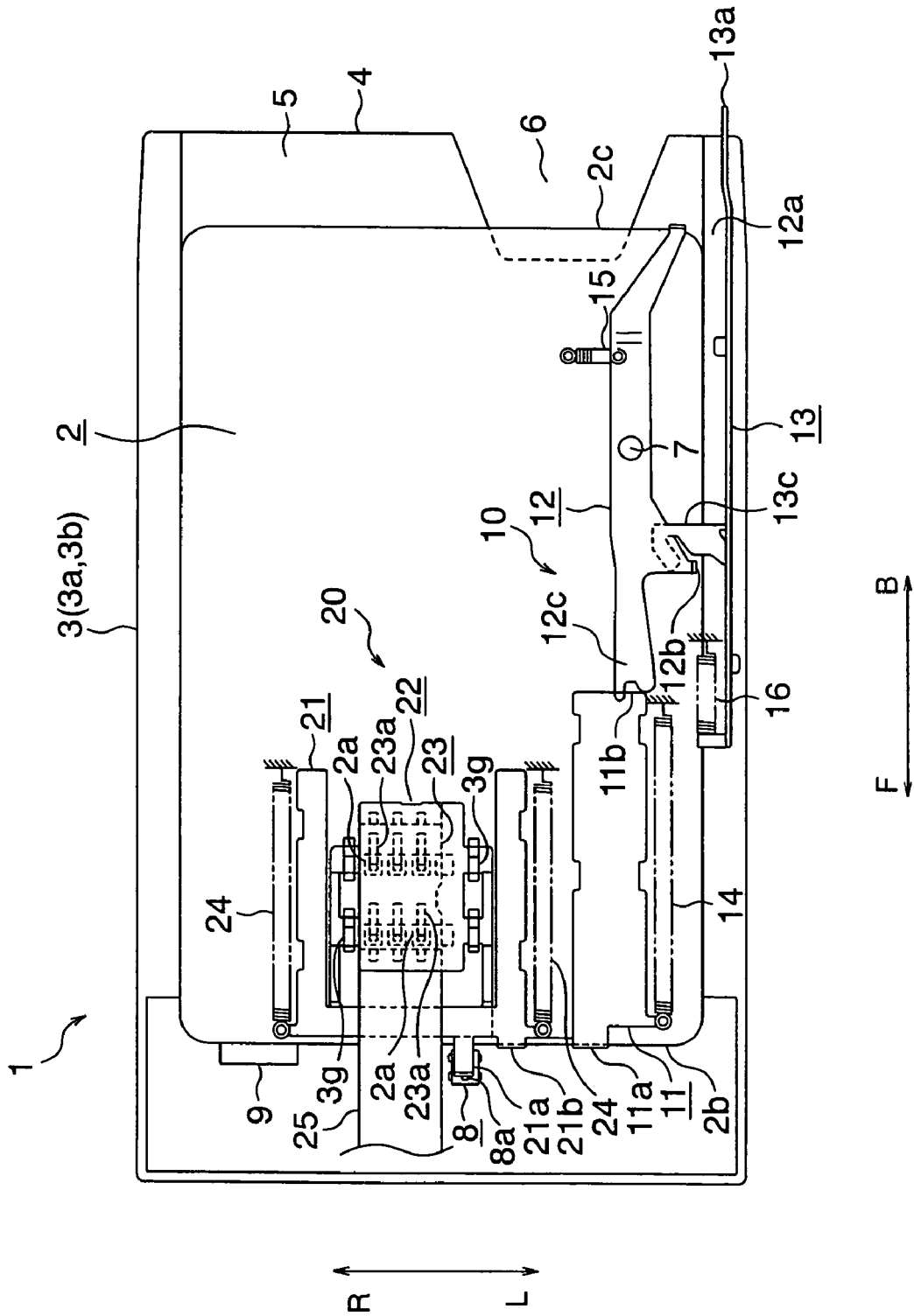
FIG. 7C is a general plan view explaining the operation of the IC card reader.
Figure 8A:
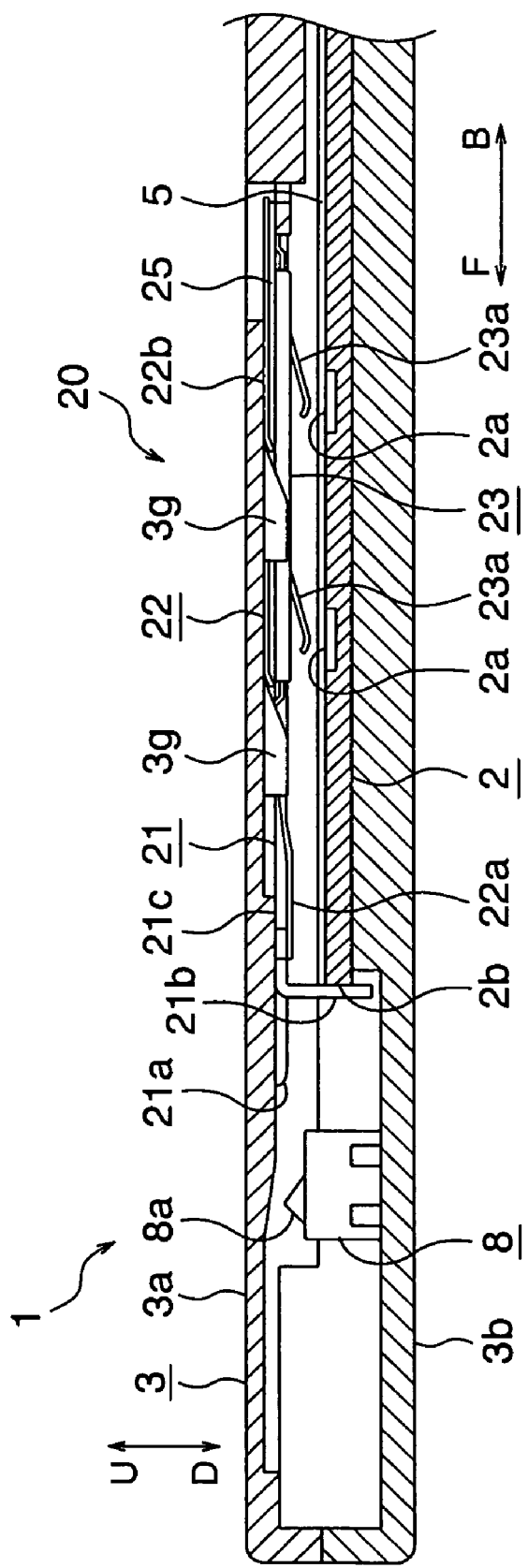
FIG. 8A is an enlarged lateral cross-sectional view of the principal portion, explaining the operation of the IC card reader.

FIGS. 7A-7D and 8A-8D are diagrams explaining the operation of the aforementioned IC card reader 1. FIGS. 7A and 7B are general plan views of IC card reader 1, and FIGS. 8A and 8B are enlarged lateral cross-sectional views of the principal portion of IC card reader 1. When IC card 2 is progressively inserted, from the state shown in FIGS. 1A and 1B, in the F direction into card insertion path 5, advanced end 2b of IC card 2 makes contact with tab 21b of slider 21 and tab 11a of plate 11, as shown in FIGS. 7A and 8A. In this way, slider 21 and plate 11 are pushed by IC card 2 and respectively move progressively in the insertion direction F.

As a result of slider 21 progressively moving in the insertion direction F, plate spring 22 fastened to slider 21 makes contact with protrusions 3g, as shown in FIG. 8B, and progressively gets deflected in the D direction toward card insertion path 5 along protrusions 3g. In this way, contactors 23a of connector 23 mounted to plate spring 22 gradually descend and advance into card insertion path 5 and gradually make contact with IC contact points 2a of IC card 2. Also, IC card 2 has its bottom face supported by lower frame 3b. Also, at this point, as a result of plate 11 progressively moving in the insertion direction F, the position of contact between tab 11b of plate 11 and end portion 12c of lever 12 progressively shifts in the F direction, as shown in FIG. 7B.

As a result of IC card 2 being progressively inserted and slider 21 gradually moving in the F direction, when contact side 21a of slider 21 makes contact with actuator 8a of photomicrosensor 8, photomicrosensor 8 gets switched over from an OFF state to an ON state and detects that IC card 2 has been completely inserted up to the prescribed position of card insertion path 5, as shown in FIG. 7C. At this point, advanced end 2b of IC card 2 makes contact with stopper 9 and the insertion of IC card 2 in the F direction is halted.

As shown in FIG. 8C, when IC card 2 is completely inserted, plate spring 22 hits the front face (the face on the side of card insertion path 5) of protrusions 3g and enters a state wherein it is in maximum proximity of IC card 2. In this way, contactor 23a is pushed by plate spring 22 and elastically deformed, and makes contact with IC contact points 2a of IC card 2 at a prescribed pressure. Also, at this point, end portion 12c of lever 12 is separated from tab 11b of lever 11, and lever 12 rotates in a counter-clockwise direction due to the elastic force of coil spring 15, as shown in FIG. 7C. As a result, tab 12a of lever 12 makes contact with a rear end 2c of IC card 2, and protrusion or extraction of IC card 2 from card insertion path 5 is blocked. Also, tab 12b of lever 12 is separated from hook portion 13c of ejector pin 13, and front end portion 13a of ejector pin 13 protrudes greatly from frame 3 to the exterior, due to the elastic force of coil spring 16.

When the aforementioned state is entered, IC card reader 1 communicates with IC card 2 through contactors 23a and contact points 2a of IC card 2 and performs read or write processing of information with respect to IC card 2. Slightly thereafter, after IC card reader 1 has completed the processing of information with respect to IC card 2, ejector pin 13, while moving in the F direction, catches tab 12b of lever 12 with hook portion 13c, when front end portion 13a of ejector pin 13 is pushed by a finger in the F direction, as shown in FIG. 7D. As a result, tab 12b of lever 12 is pushed in the R direction by hook portion 13c, and lever 12 rotates in the clockwise direction. When lever 12 rotates in the clockwise direction, tab 12a of lever 12 gets separated from rear end 2c of IC card 2, end portion 12c of lever 12 moves toward the R direction side of tab 11b of plate 11, and plate 11 moves in the B direction due to the elastic force of coil spring 14. Moreover, at this point, slider 21 moves in the B direction due to the elastic force of coil springs 24 and, accompanying this movement, plate spring 22 progressively moves along with protrusions 3g and has its deflection cancelled in the direction D toward card insertion path 5, as shown with an arrow in FIG. 8D. As a result, contactors 23a are biased in the direction U away from card insertion path 5 by plate spring 22 and return to the state of retraction from card insertion path 5, as shown in FIG. 8A. As described above, when plate 11 and slider 21 move in the B direction due to the elastic forces of coil springs 14, 24, IC card 2 is pushed by tab 11a of plate 11 and tab 21b of slider 21 to protrude from card insertion path 5 in the B direction, making it possible to extract IC card 2 from card insertion path 5.

By adoption of the structure described above, plate spring 22 biases contactors 23a in the U direction away from card insertion path 5 to retract them when IC card 2 is not yet inserted into card insertion path 5, and plate spring 22 gets deflected in the D direction toward card insertion path 5 to bring contactors 23a into contact with IC contact points 2a of IC card 2, when IC card 2 is inserted into card insertion path 5. Because of this, it becomes difficult for deformation or damage of contactors 23a to occur, and it becomes possible to provide for an extension of the lifetime of IC card reader 1. In addition, through the mounting of contactors 23a to plate spring 22 which moves together with slider 21, by the bringing of the concerned plate spring 22 into contact with protrusions 3g, and by its deflection, contactors 23a move from a position of retraction from card insertion path 5 to a position wherein they can make contact with IC contact points 2a of IC card 2. For this reason, it is acceptable to ensure just a relatively small space above card insertion path 5 making it possible to retract contactors 23a from card insertion path 5, i.e. a space including the thickness of plate spring 22, the thickness of FPC 25, the height of contactors 23a (the height from lead portions 23b to contact points 23c), some clearance between contactors 23a and card insertion path 5, etc., so it becomes possible to provide for making IC card reader 1 thinner.

Furthermore, through the provision of two protrusions 3g in upper frame 3a in the direction F of insertion of IC card 2, the bringing of plate spring 22 into contact with each protrusion 3g, and the deflection of it in the D direction toward card insertion path 5, plate spring 22 gets deflected approximately in parallel with respect to card insertion path 5, as shown in FIGS. 8B and 8C, and it becomes possible to retract contactors 23a in a stable manner without their hitting IC contact points 2a of IC card 2 and to make it difficult for deformation or damage of contactors 23a to occur.

In addition, by inclining the parts of protrusions 3g and plate spring 22 in mutual contact, with respect to the direction F of insertion of IC card 2, toward the D direction approaching card insertion path 5, plate spring 22 gets deflected smoothly along protrusions 3g, without hitting protrusions 3g, in the D direction approaching card insertion path 5, so it becomes possible to bring contactors 23a gradually into contact with IC contact points 2a of IC card 2 and make it difficult for deformation or damage of contactors 23a to occur.

The present invention can be adopted in various modes other than the embodiment mentioned above. For example, in the aforementioned embodiment, an example was raised wherein a total of four protrusions 3g are provided in upper frame 3a, two in the direction F of insertion of IC card 2 and two in the width directions R, L, but the present invention is not limited to this alone. Beyond this, it is acceptable to provide only one, or three or more, protrusions 3g in the direction F of insertion of IC card 2, and it is acceptable to provide only one, or three or more, of them in the width directions R, L. However, by providing several protrusions 3g, it is possible to deflect plate spring 22 approximately in parallel with card insertion path 5 and to bring contactors 23a into contact with IC contact points 2a of IC card 2 in a stable manner.

Moreover, in the aforementioned embodiment, an example was raised wherein the parts of protrusions 3g and plate spring 22 in mutual contact are inclined in a straight line toward the downward direction D at a prescribed angle with respect to the direction F of insertion of IC card 2, but the present invention is not limited to this alone. Beyond this, it is acceptable for the parts of protrusions 3g and plate spring 22 in mutual contact to be inclined in a curved line toward the downward direction D with respect to the F insertion direction. Also, it is acceptable to incline either of protrusions 3g and plate spring 22 in a straight line and to incline the other in a curved line, or to incline only one of either protrusions 3g or plate spring 22, in a straight line or in a curved line.

Furthermore, in the aforementioned embodiment, an example was shown wherein the plate spring is fastened to the slider and the plate spring gets deflected by a protrusion provided in the frame, but a mechanism wherein one end of the plate spring is fastened to the frame, the plate spring gets deflected into a concave form and a contactor connected to the plate spring is pushed into the insertion path by pushing a separate end portion of the plate spring with the slider set up to move in response to the insertion of an IC card can e.g. also be considered as a mechanism for deflecting the plate spring. With this configuration, the plate spring is also made to assume the role of biasing the slider in the IC card entry direction. As another mechanism, a mechanism wherein one end of the plate spring is fastened to the frame, one part of the slider is provided as a convex portion, the slider moves in response to an insertion of the IC card, and the plate spring gets deflected by the convex portion of the slider pushing the plate spring into the card insertion path can also be considered.

In the aforementioned embodiment, the present invention was applied to an IC card reader 1 for a contact-type IC card 2 only, but beyond this, it is possible to apply the present invention e.g. to an IC card reader equipped in its interior with an IC contact unit and a magnetic head so as to perform processing of information with respect to a magnetic IC card provided with both IC contact points and a magnetic stripe. Moreover, it is also possible to apply it to an IC card reader equipped e.g. with a transport means using rollers or the like for automatically transporting into its interior an IC card inserted into a card insertion path.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An IC card reader, comprising:
   a frame forming a card insertion path into which an IC card is inserted;
   contactors for making contact with IC contact points of said IC card;
   a slider provided so as to be moved in parallel with said card insertion path;
   a tab provided in said slider so as to make contact with the advanced end of said IC card inserted into said card insertion path;
   a spring biasing said slider in a direction counter to the direction of insertion;
   a plate spring, one end of which is fastened at said slider and other end of which is mounted at said contactors so as to face said card insertion path, for biasing said contactors in a direction away from said card insertion path and retracting said contactors from said card insertion path; and
   protrusions provided in said frame so as to face said card insertion path,
   wherein the advance end of said IC card makes contact with said tab with said IC card inserted into said card insertion path, when said slider moves in the direction of inserting said IC card, said plate spring makes contact to said protrusions to deflect in a direction toward said card insertion path, and said contactors advance into said card insertion path to make contact with said IC contact points of IC card;
   and wherein said frame is formed by superimposing and combining an upper frame and a lower frame, and said slider is supported by said upper frame, and a part moving in the insertion direction of the IC card and a part moving in the direction of approaching the IC contact points of the IC card are monolithically integrated into a single member.

2. An IC card reader according to claim 1, wherein at least two said protrusions are provided in the direction of insertion of the IC card and said plate spring makes contact with each protrusion and deflect in the direction toward said card insertion path.

3. An IC card reader according to claim 1, wherein parts of said protrusions and said plate spring to be contacted mutually are inclined with respect to the direction of insertion of the IC card, toward the direction approaching said card insertion path.

4. An IC card reader according to claim 2, wherein parts of said protrusions and said plate spring to be contacted mutually are inclined with respect to the direction of insertion of the IC card, toward the direction approaching said card insertion path.

* * * * *